Patented Mar. 28, 1939

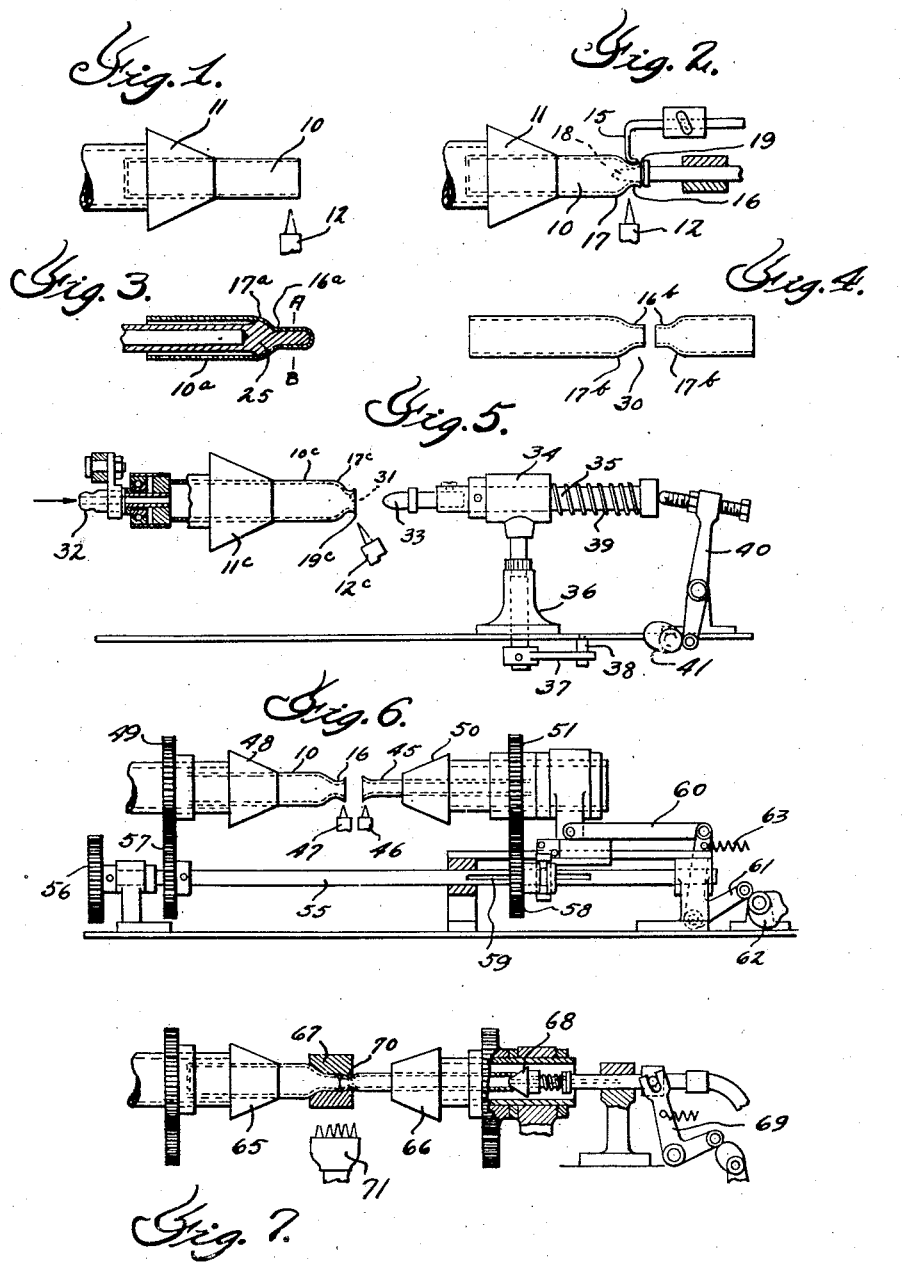

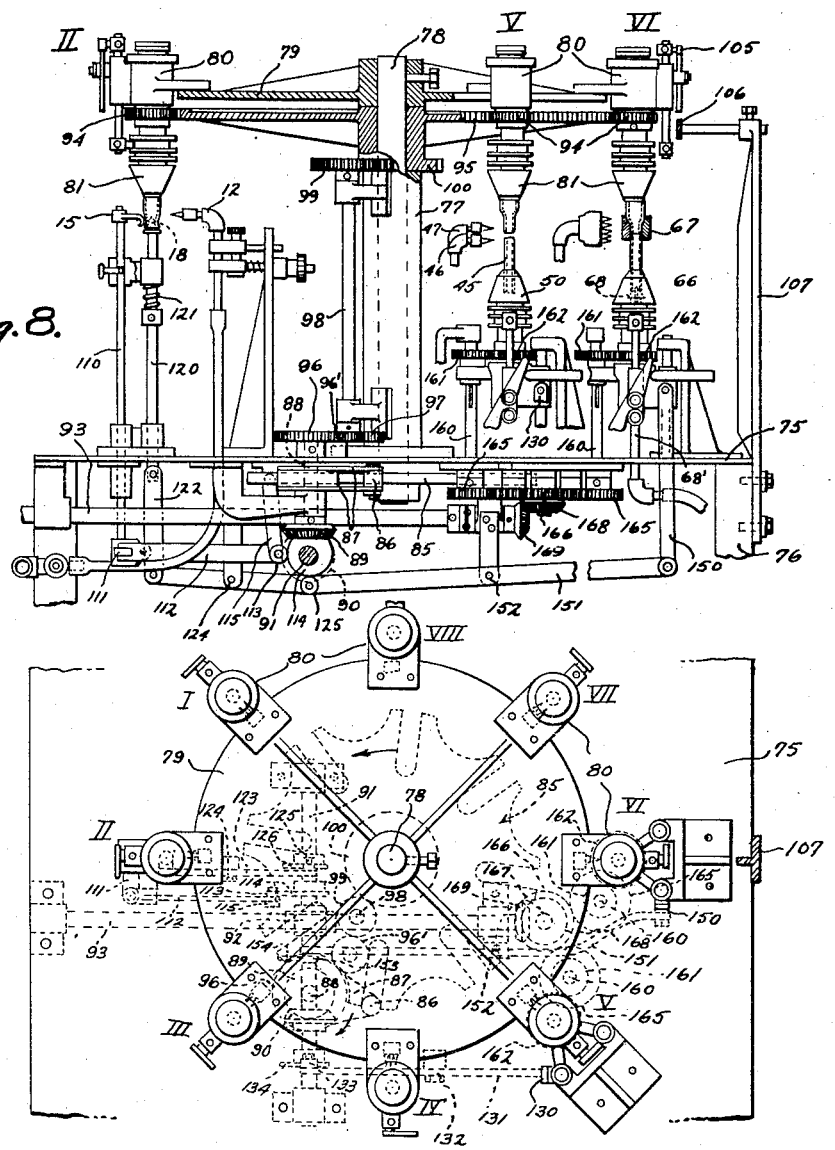

2,151,840

UNITED STATES PATENT OFFICE 2,151,840

METHOD AND APPARATUS FOR PRODUCING GLASS VESSELS

Jakob Dichter, Berlin-Schoneberg, Germany

Application January 24, 1935, Serial No. 3,244
In Germany January 26, 1934

5 Claims. (Cl. 49—7)

This invention relates generally to the forming of glass vessels and relates more particularly to a method and apparatus for producing vessels having neck portions of small diameter as compared to their body portions.

One of the primary objects of this invention is to provide a method by which wide vessels having narrower neck portions may be produced without danger of the vessels being weak at the juncture of their necks with the body portions of the vessels.

The invention contemplates further the provision of a method by which a narrow tube which constitutes the neck of the vessel may be secured as by welding or the like to a wider tube which constitutes the body of the vessel without danger of forming air bubbles or the like at the point of union between the wide and narrow tubes.

The invention further contemplates the provision of an apparatus in which the method may be practiced which apparatus may, if desired, be in the form of a machine capable of practicing the method in a substantially automatic manner.

Numerous other objects and advantages of this invention will become more apparent as the following description proceeds particularly when reference is had to the accompanying drawings which are highly diagrammatic in character and wherein Fig. 1 is a side elevational view of a tube illustrating the first step in the method of production of a vessel;

Fig. 2 is a view similar to Fig. 1 showing the second step in the method;

Fig. 3 is a sectional view showing a slightly modified manner in which the method may be practiced;

Fig. 4 is a view similar to Fig. 1 showing a further modification of the method;

Fig. 5 is a view similar to Fig. 1 showing a still further manner in which the method may be practiced;

Fig. 6 is a side elevational view showing a further step in the practicing of the method;

Fig. 7 is a view similar to Fig. 6 but partly in section showing the final step in the method;

Fig. 8 is a diagrammatic side elevational view of a machine constructed in accordance with the teachings of this invention; and Fig. 9 is a top plan view partly in section of the machine shown in Fig. 8.

Serum or flask ampoules as commonly known, are vessels having body portions of relatively wide diameter and neck portions of substantially narrower diameter. Heretofore difficulty has been encountered in producing these vessels without having them extremely weak at certain points and generally at the juncture of the narrower neck portions with the wider body portions.

One method of producing vessels of the above character has consisted in heating one end of a tube of sufficient diameter to form the body of the vessel. This heating is continued until the plastic glass runs together forming a thick ring and until the diameter of this ring is approximately that desired in the neck of the vessel. A smaller tube of the desired neck diameter is then slightly heated at one end and welded to the plastic ring of the larger tube. Air is then blown through the smaller tube to blow the plastic ring of the larger tube in the shape of a rounded shoulder at the juncture of the larger and smaller tubes.

In the practicing of this method, a shoulder weakness may result unless extreme care is taken to provide a sufficient quantity of glass to produce the shoulder. Additionally, since the smaller tube is sealed to a rather heavy plastic ring on the larger tube, difficulty is encountered in preventing the formation of air bubbles within the plastic ring. This results from the fact that while the outer edges of the plastic ring may be semi-plastic the interior of the plastic ring is composed of molten glass and the contact of the cooler smaller tube with the plastic ring causes the formation of the air bubbles which subsequently frequently break or at least cause strains in the vessels at this point.

A second method which has been practiced has consisted in blowing the wide body of the vessel in a mold so that the narrower tube formed the neck of the vessel. Obviously, in this method the body part of the vessel had a thin wall as compared to the thickness of the wall of the neck and this weaker wall resulted in frequent breaking of the ampoules.

The present invention contemplates the elimination of the difficulties of the prior practices by a method which produces ampoules which are free from weakened portions. Broadly, the method consists in forming a shoulder and neck on one end of a relatively wide tube, the wall thickness of the shoulder and neck being the same as that of the body of the tube. The formation of the shoulder and neck on the wide tube may be accomplished in several ways as will hereinafter be more fully brought out.

An open ended neck tube of suitable diameter is then heated at its one end and sealed to the open end of the neck portion previously formed on the wide tube. Preferably both tubes are provided on their ends with outwardly flared portions so that the seal will be effected more readily while additionally the tubes are preferably given a push and pull movement relative to each other during the sealing operation to knead the abutting portions of the glass tubes together to insure that the smaller tube is in contact all around its circumference with the plastic section of the larger tube.

After the sealing operation is completed, a mold is brought over the sealed section and air is admitted to the tubes to blow the sealed portions of the tubes to thus form a smooth seal. If desired, a constriction may be formed in the ampoule during this operation to facilitate the later breaking of the neck portion from the body portion of the ampoule and additionally the ampoule may be shaped in any manner if such action is desired.

Referring then to the drawings wherein the method is diagrammatically illustrated, there is shown in Fig. 1 a wide tube 10 suitably supported in a chuck 11. The chuck may be rotated by hand or by suitable gearing (not shown) to impart rotation to the tube 10. During this rotation, the tube is heated adjacent its open end as by a suitable burner 12, the heat being continued until the glass is sufficiently plastic to permit forming of the neck and shoulder on the tube. After the glass has been sufficiently heated and during continued heating thereof, the open end of the tube is subjected to the action of a forming tool 15, which is suitably shaped to form a reduced neck 16 which is joined to the body portion of the tube by a shoulder 17. During this forming operation a tool or core 18 is preferably inserted in the mouth of the tube as illustrated in Fig. 2 of the drawings. It is also preferable to flare out the end of the neck 16 as designated by the reference character 19.

In Fig. 3 a slightly modified method of forming a reduced neck and shoulder on a wider tube is illustrated, the method consisting in melting back the wall of the tube 10ª while a tool 25 pushes a projection or neck 16ª on the tube. It will be noted that the tool 25 also forms a shoulder 17ª at the juncture of the neck 16ª with the body of the tube.

When the neck and shoulder are formed in this manner, it might be noted that during the pushing out of the closed end of the tube by the tool 25 there must be sufficient glass of a proper plasticity since otherwise the push rod or tool would release the tube from its supporting chuck. This insures that there will be sufficient glass to form a shoulder and reduced portion or neck with a wall of the desired thickness with the result that the ampoule subsequently formed will not be weak at this point.

After the shoulder and neck have been formed in the manner illustrated in Fig. 3, the closed end of the neck will be cut off along the line A—B and if desired, the free end of the neck may be flared outwardly in any desired manner (not shown).

In Fig. 4, a further modified method of forming the shoulder and neck on wider tubes is illustrated. In this method, a piece of tubing of sufficient length to form two flask bodies is narrowed as at 30 to form reduced necks 16ᵇ and shoulders 17ᵇ. In this shaping of the glass tube, the glass is allowed to flow to a thickened mass before the tube is stretched but there is no possibility of the shoulders 17ᵇ being weakened for the reason that there is no sealing effected between these shoulders and the reduced portions 16ᵇ. After the two reduced portions and the two shoulders have been formed, the tube is divided into two sections as illustrated, so that two flask bodies are produced.

In Fig. 5 a still further modified method of forming the flask body is illustrated. Here a roundled bottomed tube 10ᶜ closed at its one end is supported in a chuck 11ᶜ to which rotation may be imparted in any desired manner. The tip of the closed end of the tube is heated by a burner 12ᶜ and a small opening 31 is then blown in the heated end of the tube as for example, by a suitable air supply nozzle 32 which is held firmly against the open end of the tube.

The bottom of the tube is then further heated and a pointed tool 33 is entered in the opening 31, this tool being given a slight downward or lateral pressure, while the glass tube is being revolved. This enlarges the opening 31 and also flares the edges of the opening as designated by the reference character 19ᶜ.

It will be apparent that in this method the shoulders 17ᶜ result from the shape of the bottom on the original tube. Thus these shoulders will be of a wall thickness equal to that of the tube body.

While any desired means may be provided for actuating the tool 33, there is diagrammatically illustrated a support 34 for a shaft 35, this shaft carrying the tool 33. The support 34 may be suitably turned in a supporting bearing 36, and if desired, a suitable lever 37 and cam 38 may be provided for this purpose. The turning of the support 34 moves the tool 33 laterally with reference to the opening 31 although, if desired, the tool might be rocked so that it exerts a downward pressure rather than a lateral pressure on the tube end as previously mentioned.

The tool is retracted by a spring 39 sleeved on the shaft 35 and is advanced toward the glass tube by a lever 40 which in turn is actuated by a suitable cam 41.

As thus far described, it will be apparent that the invention provides several methods for producing what might be termed the body of the ampoule. In general, the methods consist in heating the open end of a tube the diameter of which is that desired in the body of the ampoule. The heated end is then shaped at its open end to provide a narrow portion which is of substantially the diameter of the neck which is to be later sealed to the body of the ampoule. The narrow portion of the body is joined to the main portion of the ampoule body by a shoulder of the desired shape. In each case, the shoulders and the narrower portions of the bodies are substantially the same wall thickness as the larger portions of the bodies with the result that there are no weakened portions in the ampoule bodies.

The next step in the method consists in sealing to the narrower portions of the ampoule bodies the necks of the ampoules. In carrying out this step of the method an open ended tube 45 is selected, this tube being of the diameter desired, in the ampoule neck. One end of this tube is heated by a burner 46 while at the same time the open end 16 of the narrower portion of the ampoule body is heated by a burner 47. During this heating the ampoule body 10 is supported in a chuck 48 which may be rotatably driven by a suitable gear 49. The stem or neck is supported in a chuck 50 which is driven by a gear 51.

The numeral 55 designates a main drive shaft which is driven in any suitable manner by a main drive gear 56, the shaft 55 carrying the gear 57 which meshes with the gear 49. A second gear 58 keyed on the shaft 55 by way of keyway 59, meshes with the gear 51.

The gear 51 and its associated structure together with the gear 58 may be reciprocated by a lever 60 actuated by a bell crank lever 61 which in turn is actuated by a cam 62. A spring 63 normally acts to retract the chuck 50 as will be apparent.

In operation, the chucks 48 and 50 are driven at the same speed by their respective gears and during this rotation of the ampoule body and the ampoule neck the adjacent ends of the body and neck are heated until they become sufficiently plastic to form a union with each other. The chuck 50 is then moved back and forth to effect a kneading and sealing of the ampoule neck and ampoule body, the kneading of the joint insuring that the small tube is in contact all around its circumference with the plastic section of the reduced end of the larger tube.

After the small diameter open ended tube is sealed to the open reduced end of the larger tube, the sealed joint is blown up to smooth the seal. This is effected by mounting the ampoule in chucks 65 and 66 which are suitably rotatably driven at the same speed. A mold 67 is caused to embrace the sealed joint between the narrower tube and the larger tube and air is then blown into the open end of the narrower tube. This may be accomplished by a suitable air discharge nozzle 68 which is moved into engagement with the open end of the narrower tube by a lever 69. This blowing of the sealed joint in the mold effects the desired smoothing and shaping of the joint.

If desired, a ring 70 may be formed in the mold to form a constriction in the smaller diameter tube to facilitate later opening of the ampoule. Additionally, if desired, the mold might be so shaped as to impart some configuration to the adjacent portion of the ampoule, if desired. It will be understood that during the molding operation the mold and the embraced portion of the ampoule are heated by a suitable burner 71.

In Figs. 8 and 9 there is diagrammatically illustrated a machine by which the method may be practiced in a substantially automatic manner. As illustrated, the machine comprises a base plate 75 suitably supported by the legs 76. Carried by the base plate and projecting upwardly therefrom is a centrally disposed standard 77 which constitutes a bearing for a shaft 78.

Carried by the upper end of the shaft 78 is a webbed plate 79 which carries at spaced points on its periphery bearings 80 for chucks 81. As diagrammatically illustrated in Fig. 9 of the drawings, eight chucks are provided and in operation these chucks are moved to eight processing stations about the axis or shaft 78.

For rotating the shaft 78 with a step by step movement, there is fixed to the lower end thereof a Geneva gear 85 adapted to be actuated by a roller 86 carried by spaced plates 87 which are fixed to a shaft 88 for rotation therewith. This shaft is driven by the bevel pinions 89 and 90, the latter being carried by a shaft 91 which is driven by a suitable worm and worm wheel 92 from a main drive shaft 93.

For rotating the chucks, each chuck is provided with a pinion 94, all of these pinions being engaged by a large gear 95 rotatably journalled on the shaft 78 adjacent the upper end thereof. For driving the large gear 95 there is provided a gear 96 fixed to the shaft 88, this gear through the idler gear 96' driving a gear 97 on the lower end of a shaft 98 to the upper end of which is secured a gear 99 which in turn meshes with a gear 100 fixed to the large gear 95. It will be apparent that with this construction the chucks will be intermittently moved about the shaft 78 by virtue of the intermittent rotation of this shaft while the chucks will be continuously rotated to thus rotate the ware carried by the same.

The chucks may be of any desired construction and may be opened and closed by suitable levers 105 and associated mechanism which are actuated by cams 106 carried by uprights 107 which in turn are supported by the base. Since chucks of this character together with the opening and closing means thereof are quite generally utilized in the handling of glass tubes, the structure of the chucks and the actuating mechanism is not illustrated in detail.

In Fig. 9 of the drawings, the several processing stations are indicated by the Roman numerals I to VIII inclusive. As each chuck 80 arrives at station I, a tube of relative wide diameter which is adapted to form the body of the flask is inserted in the chuck. During the travel of the tube and its chuck from station I to station II, the lower end of the tube is heated, this heating being continued at station II by the burner 12. Also at station II tool 15 is provided, this tool engaging the heated end of the tube to shape the same in the manner illustrated in Fig. 2 of the drawings. It might be noted that the tool is fixed to the upper end of a shaft 110 and that this shaft is adapted to be slightly rotated to rock the tool into and out of engagement with the heated end of the glass tube. For rotating the shaft 110, the lower end thereof is provided with a projecting arm 111 to which is connected a link 112, this link carrying a roller 113 which rides on a cam 114 fixed to the shaft 91. A link 115 suspends the end of the link 112 in proper position with reference to the cam.

There is also provided at station II a plug or tool 18 which is adapted to enter the open end of the glass tube. This tool is carried on the end of a shaft 120 and is normally urged downwardly by a spring 121. The tool is elevated into operative position by a link 122 which is pivotally secured to the end of a lever 123 pivotally mounted as at 124 and having a roller 125 which rides on a cam 126.

From stations II to V the tube end is heated by suitable burners (not shown) after which at station V the tube of narrower diameter is sealed to the lower end of the tube 10. As diagrammatically illustrated, there is provided a lower chuck 50 which carries the smaller tube 45, this tube being adapted to be elevated by a link 130 which is connected to an arm 131. This arm is pivoted as at 132 and is connected at its one end to a roller 133 which rides on a cam 134, carried by the shaft 91.

It will be noted that suitable burners 46 and 47 are provided for heating the portions of the tubes to be sealed while suitable mechanism is provided for opening and closing the chuck during vertical movement thereof.

At station VI, the sealed section of the ampoule is embraced by a mold 67, the smaller end of the ampoule being at this time grasped by a chuck 66. This chuck is elevated into engaging position with reference to the smaller end of the chuck by a link 150 pivoted to one end of a lever 151. This lever is pivotally supported intermediate its ends as at 152 and carries at its end a roller 153 which engages a fourth cam 154 on the shaft 91. Thus it will be apparent that chuck 66 will be raised and lowered in timed relation to the rotation of the shaft 91 as will also the chuck 50.

For rotating the chucks 50 and 66 there are provided shafts 160 which carry at their upper ends gears 161 which engage gears 162 carried by the chucks. At their lower ends the shafts 160 are secured to gears 165 which are engaged by a gear 166 carried by a stub shaft 167. The bevel pinion 168 fixed to this shaft is engaged by a pinion 169 on the shaft 93.

It might be noted that the shafts 160 are similar to the shaft 55, the gears 161 being keyed thereon for movement longitudinally thereof. Thus the chucks 50 and 66 may be raised and lowered while they are continuously rotated by their respective driving gears. While the ampoule is embraced by the mold 66, air is introduced into the open smaller end thereof by a nozzle 68 which is supplied with air under pressure by a suitable supply pipe 68'. After the sealed sections of the ampoules have been blown in the molds 67, the ampoules are carried to stations VII and VIII, being cooled during this portion of their travel and being removed from the chucks 81 at station VIII.

From the above it will be apparent that the invention provides not only a method but also a machine by which a tube having a diameter of that desired in the ampoule body may have its one end heated and may then have this end shaped to form a shoulder and a reduced free end portion which terminates in a slight outward flare. A second smaller tube of the diameter desired in the ampoule neck then has its one end heated and flared and then sealed to the narrowed end of the first or larger tube. During this sealing the tubes are pulled back and forth to effect an intimate contact between their abutting ends and to thus form a perfect seal between the smaller tube and the reduced end of the larger tube. The invention then provides means for blowing the sealed sections in a mold to smooth the seal. If desired, at this station in the machine means might be provided for shaping the ampoule as for example, by blowing a bulb or the like in the same.

In the practicing of the invention it will be apparent that the shoulder of the completed flask will not be weakened but will be of the same wall thickness as the body of the flask. The sealed junction exists between a narrowed or reduced portion of the wider or body portion of the flask and the narrow neck portion of the flask. Additionally, the reduced portion of the body of the flask is so formed that this portion also has a wall thickness substantially equal to that of the body of the flask with the result that the flask is not weakened at this point.

While the invention has been described with some detail, it will be understood that the description is for the purposes of illustration only and is not definitive of the limits of the inventive idea. The right is reserved to make such changes in the details of construction and the steps of the method as will fall within the purview of the attached claims.

What I claim as my invention is:

1. In a machine of the class described, means for heating one end of a tube of relatively large diameter, means for engaging a tool with the heated end of the tube to form a shoulder thereon and a reduced extension which projects beyond the shoulder, means for heating the free end of the reduced extension of the tube and the end of a tube of smaller diameter, means for engaging the end of the tube of smaller diameter with the reduced extension of the first mentioned tube, and means for blowing the joint between the two tube sections into engagement with a mold.

2. In a machine for the class described, a chuck adapted to grip one end of a tube of relatively large diameter, means for rotating said chuck, means for moving said chuck with a step by step movement to a plurality of processing stations, means for heating the exposed end of a tube carried by said chuck, a tool movable into engagement with the heated end of the tube at one of the processing stations to shape the heated end of the tube to form a shoulder thereon which terminates in a reduced extension, means for moving the chuck with the tube therein to another of the processing stations and into alignment with a second chuck adapted to grip one end of a tube of relatively small diameter, means for heating the adjacent ends of both of said tubes supported by the chucks, means for reciprocating the second chuck to effect a sealing engagement between the heated end of the tube carried thereby and the heated end of the tube carried by the first mentioned chuck, means for moving the first mentioned chuck into alignment with a third chuck adapted to engage the free end of the tube of smaller diameter, a mold adapted to surround the joint between the two tubes, and means associated with said third chuck for discharging air under pressure into the interiors of the tubes to blow the joint thereof into engagement with the mold.

3. In a machine of the class described, a chuck, means for rotating said chuck, means for moving said chuck with a step by step movement to a plurality of processing stations, means for heating one end of a tube carried by said chuck, a second chuck located at one of said stations adapted to move a tube of smaller diameter into sealing engagement with the heated end of the tube carried by the first mentioned chuck, and means operating to reciprocate the second mentioned chuck when the first mentioned chuck is aligned with the same to knead the abutting portions of the glass tubes together.

4. The method of forming an ampoule having a body of relatively large diameter and a neck of relatively small diameter which consists in shaping one end of a tube of relatively large diameter to form a shoulder thereon and a neck of reduced diameter which projects beyond the shoulder, outwardly flaring the free end portion of the said neck, outwardly flaring one end of a tube of relatively small diameter, heating the outwardly flaring portions of the neck and tube and engaging the outwardly flared portions of the neck and tube with each other and kneading the same to effect a sealing engagement between the small diameter tube and the neck of the large diameter tube.

5. In a machine of the class described, a chuck adapted to grip one end of a tube of relatively large diameter, means for rotating said chuck, means for heating the exposed end of a tube carried by said chuck, means for shaping the heated end of the tube to form a shoulder thereon and a neck portion of reduced diameter which projects beyond the said shoulder, means for moving the chuck with the tube therein into alignment with a second chuck adapted to grip one end of a tube of relatively small diameter, means for heating the adjacent ends of both of the tubes supported by said chucks, means for effecting relative movement between said chucks to effect a sealing engagement between the heated ends of the tubes carried thereby, means for releasing engagement between the second chuck and the tube of relatively small diameter, means for moving the first chuck and the two tubes now carried thereby into engagement with a third chuck adapted to engage the free end of the tube of smaller diameter, a mold adapted to surround the joint between the two tubes and means associated with the third chuck for discharging air under pressure into the interiors of the tubes to blow the joint between the same into engagement with the mold.

JAKOB DICHTER.